(12) United States Patent
Hong et al.

(10) Patent No.: US 7,676,704 B2
(45) Date of Patent: Mar. 9, 2010

(54) RESOURCE MANAGEMENT FOR SCALABLE FILE SYSTEM RECOVERY

(75) Inventors: Bo Hong, Mountain View, CA (US);
John Colgrove, Los Altos, CA (US);
Ramon Pantin, Palo Alto, CA (US);
Feng Wang, Sunnyvale, CA (US); Oleg Kiselev, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 370 days.

(21) Appl. No.: 11/772,036

(22) Filed: Jun. 29, 2007

(65) Prior Publication Data
US 2009/0006494 A1    Jan. 1, 2009

(51) Int. Cl.
*G06F 11/00* (2006.01)

(52) U.S. Cl. ........................................................ 714/48

(58) Field of Classification Search ........................ None
See application file for complete search history.

(56) References Cited

U.S. PATENT DOCUMENTS

| | | | |
|---|---|---|---|
| 5,828,876 A | 10/1998 | Fish et al. | |
| 5,875,444 A | 2/1999 | Hughes | |
| 6,058,400 A | 5/2000 | Slaughter | |
| 7,093,086 B1 | 8/2006 | van Rietschote | |
| 7,546,319 B1 * | 6/2009 | Srinivasan et al. | 707/200 |
| 7,552,146 B1 * | 6/2009 | Kahn et al. | 707/202 |
| 2002/0138502 A1 * | 9/2002 | Gupta | 707/200 |
| 2006/0288026 A1 * | 12/2006 | Zayas et al. | 707/101 |
| 2007/0067256 A1 * | 3/2007 | Zayas et al. | 707/1 |
| 2008/0189343 A1 * | 8/2008 | Hyer et al. | 707/205 |

OTHER PUBLICATIONS

Lloyd, Seth; "Ultimate Physical Limits to Computation"; insight review articles; Nature, vol. 406, Aug. 31, 2000; www.nature.com; Macmillan Magazines Ltd. © 2000; pp. 1047-1054.

* cited by examiner

*Primary Examiner*—Michael C Maskulinski
(74) *Attorney, Agent, or Firm*—Rory D. Rankin; Meyertons Hood Kivlin Kowert & Goetzel, P.C.

(57) ABSTRACT

A system and method for storing data. In one embodiment, a file system stores data including associated metadata. In response to detecting that a file system error has occurred, the file system identifies a container including data in which the error occurred and performs a consistency check of the data included in the container. If a bidirectional link exists between the container and another container and if an error is found in the bidirectional link, the file system performs a consistency check of data included in the other container and determines if another bidirectional link exists between the other container and a third container. If another bidirectional link exists between the other container and a third container and if an error is found in the other bidirectional link, the file system performs a consistency check of data included in the third container.

15 Claims, 11 Drawing Sheets

RESOURCE MANAGEMENT FOR SCALABLE FILE SYSTEM RECOVERY

BACKGROUND OF THE INVENTION

1. Field of the Invention

This invention relates to computer systems and, more particularly, to resource management of file systems within computer systems.

2. Description of the Related Art

Computer file storage systems are becoming increasingly large, consuming large numbers of resources and presenting scalability problems for a variety of file system operations. In particular, in conventional file systems, the amount of time needed to repair a damaged file system may, at best, grow proportionately with the size of file system metadata. While repairs are taking place, the file system is generally taken offline, resulting in unacceptably long periods during which the stored files are not accessible.

One reason repairing a damaged file system is so time-consuming is that resources are allocated globally and without constraint. Therefore, an error may affect any portion of the file system, necessitating exhaustive consistency checking. In other words, the fault domain may be the entire file system. To support utilities such as the well know File System Consistency Checker (FSCK), global metadata tracking tables may have to be maintained. During operation of FSCK, these tracking tables must be accessible. Consequently, stress is placed on the virtual memory subsystem and it may be difficult to parallelize consistency-checking operations. If a large file system is portioned into many smaller file systems, repair of one of the smaller systems may be faster. However, there may also be unacceptable management overhead and the semantics of a single file system may be lost. A variety of techniques may be employed to reduce the time needed to run FSCK-like utilities. However, some types of errors, such as those caused by software bugs or outside agencies may still require time-consuming consistency checking. In view of the above, a more effective system and method for dynamically managing the resources of a file system that account for these issues are desired.

SUMMARY OF THE INVENTION

Various embodiments of a computer system and methods are disclosed. In one embodiment, a computer system includes a file system comprising stored data and associated stored metadata. In response to detecting that a file system error has occurred, the file system is configured to identify a first container including file data and associated metadata in which the error occurred and perform a consistency check of the file data and associated metadata included in the first container. In one embodiment, a container is a dynamically created, variable-sized portion of a file system that includes a number of allocated units of data storage and associated units of metadata storage. In a further embodiment, data may be stored in blocks and associated metadata stored in inodes. Containers may be used to isolate ownership of inodes and blocks. For example, inodes in a container may only reference blocks in the same container. If a bidirectional link exists between the first container and a second container and if an error is found in the bidirectional link, the file system is further configured to perform a consistency check of file data and associated metadata included in the second container and determine if a second bidirectional link exists between the second container and a third container. If a bidirectional link exists between the second container and a third container and if an error is found in the second bidirectional link, the file system is further configured to perform a consistency check of file data and associated metadata included in the third container.

In response to receiving a request to store new file data, the file system is further configured to identify a target container that includes previously stored data linked to the new file data in a logical namespace. If the new file data does not include a new directory, or if the new file data includes a new directory and the target container has sufficient resources to accommodate a new directory, the file system is further configured to store the new file data in the target container. If the target container does not have sufficient resources for a new directory, the file system is further configured to create a linked container, store the file data in the linked container, and store a bidirectional link between the target container and the linked container. In response to a file system operation such as moving a file in a logical namespace, or renaming a file, the file system may be further configured to store a bidirectional link between a third container and a fourth container in response to detecting the operation creates a connection in the logical namespace between data stored in the third container and data stored in the fourth container.

The file system is further configured to maintain a table of bidirectional links between containers. The table of bidirectional links includes at least one pair of entries, each entry identifying a source container, a source inode, and a destination inode. The source inode of a given entry is used to store metadata associated with file data stored in the source container of the given entry. The destination inode of a first entry of a given pair is the same as the source inode of a second entry of the given pair.

These and other embodiments will become apparent upon consideration of the following description and accompanying drawings.

Figure 1:
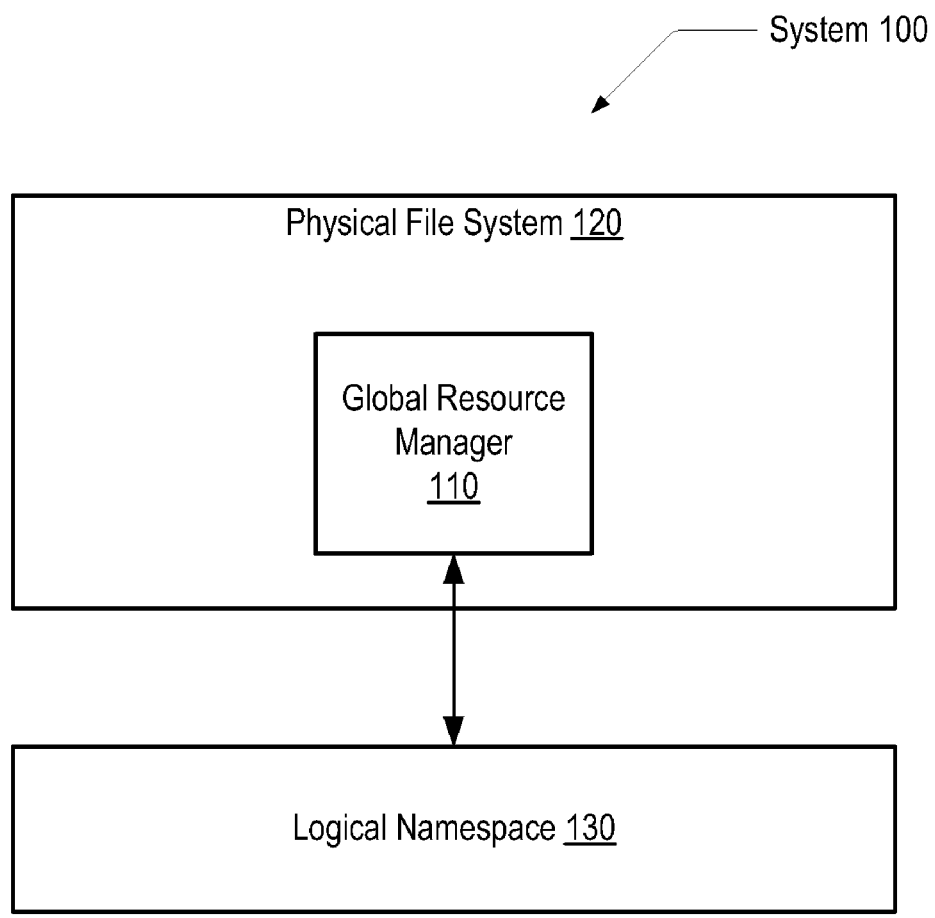
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes a physical file system 120 and a logical namespace 130. Physical file system 120 may include a global resource manager 110 coupled to logical namespace 130. In an alternative embodiment, global resource manager 110 may be a stand-alone component. Physical file system 120 may also be coupled to one or more data storage devices such as hard disks or CD-ROMs, etc. Conventionally, physical file system 120 may be further coupled to one or more processing elements (not shown) or other standard computer system components.

Global resource manager 110 may be responsible for allocating resources of physical file system 120 such as inodes, blocks, or other physical units of metadata and data storage. Global resource manager 110 may also maintain data structures that track resource allocation. In addition, global resource manager 110 may track the status of physical file system 120 and detect and correct errors that may arise due to aborted operations, software bugs, sudden power interruption, etc. Global resource manager 110 may be implemented in hardware, software, or a combination thereof.

Figure 2:
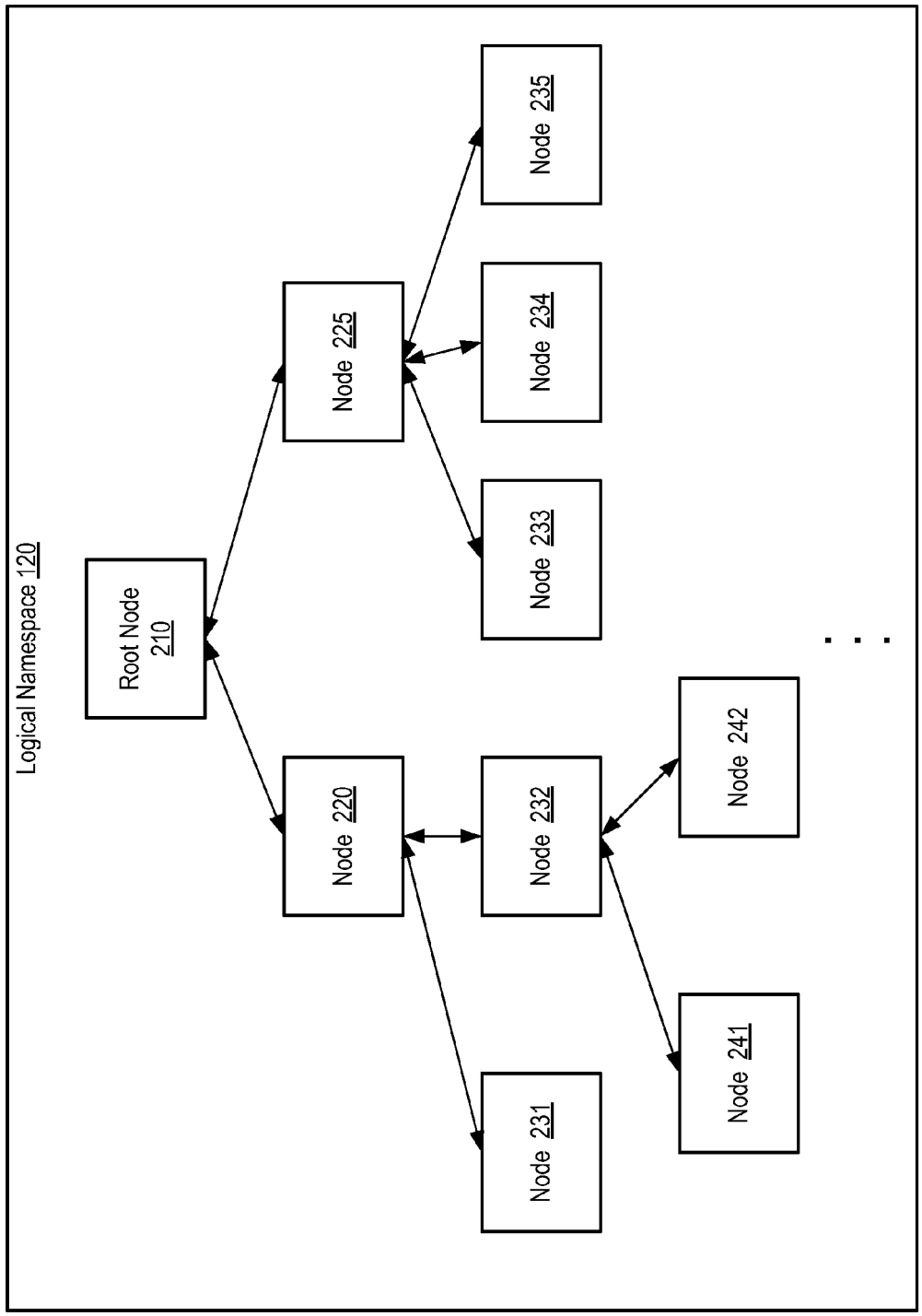
FIG. 2 illustrates one embodiment of logical namespace.

FIG. 2 illustrates one embodiment of logical namespace 130. In the illustrated embodiment, namespace 130 begins with a root node 210 and includes nodes 220, 225, 231-235, 241, and 242. Nodes 220 and 225 may be linked to root node 210, nodes 231 and 232 may be linked to node 220, nodes 233-235 may be linked to node 225, and nodes 241 and 242 may be linked to node 232. Nodes may be linked in a hierarchy of levels. For example, nodes 220 and 225 may form a second level of a hierarchy, nodes 231-235 a third level, etc. In alternative embodiments, namespace 130 may include many more nodes and many more levels than the ones shown in FIG. 2, including less than or more than two nodes linked to the root node.

During operation, when files are stored in system 100, a user may select a target location within logical namespace 130. The target location in logical namespace 130 may be mapped to a physical location in file system 120. Global resource manager 110 may manage the allocation of resources within file system 120 and perform maintenance operations such as detecting and correcting metadata errors and other inconsistencies in file system 120 according to processes that will be described further below.

Figure 3A:
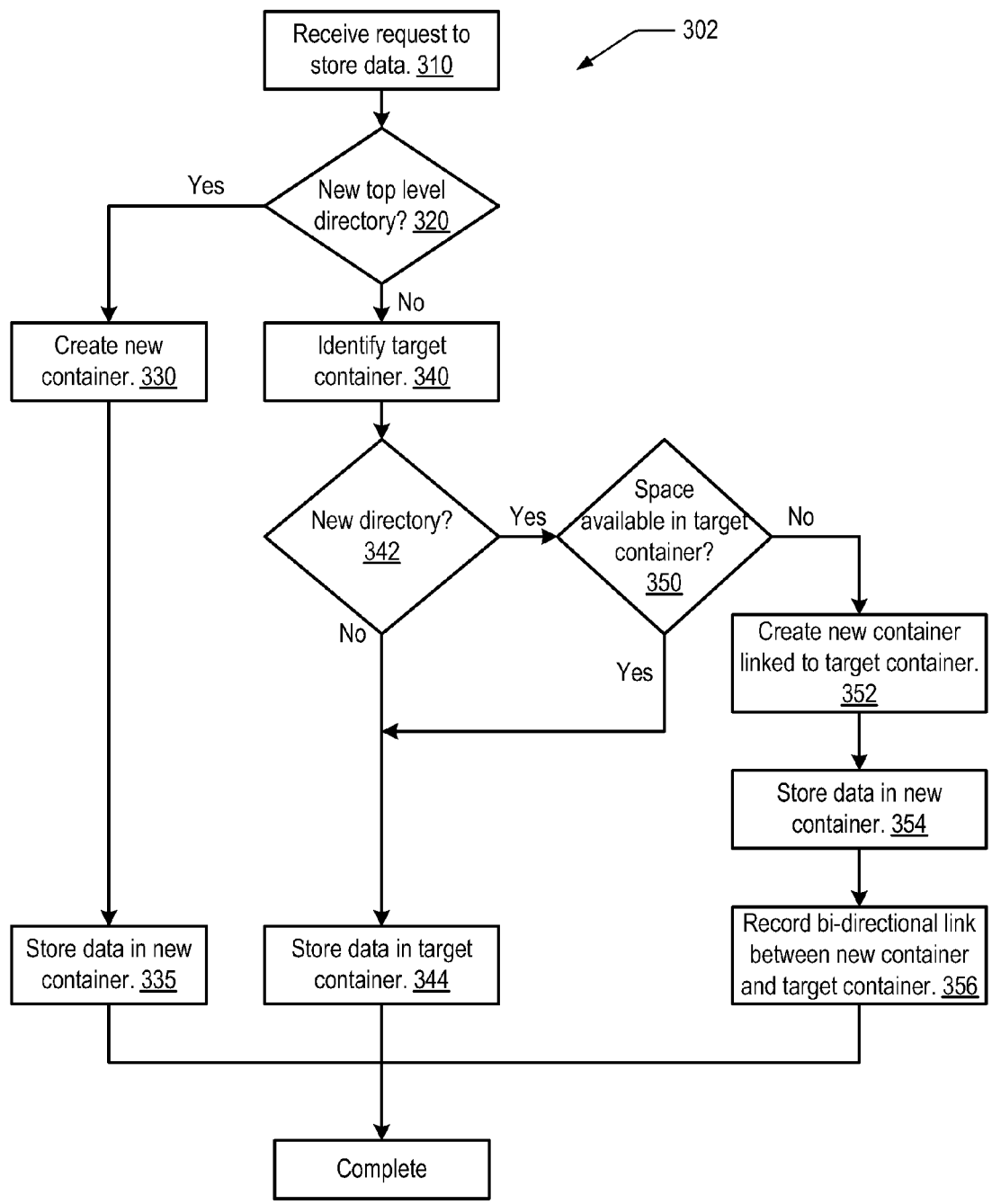
FIG. 3a illustrates one embodiment of a process that may be used to store data within a file system.
Figure 3B:
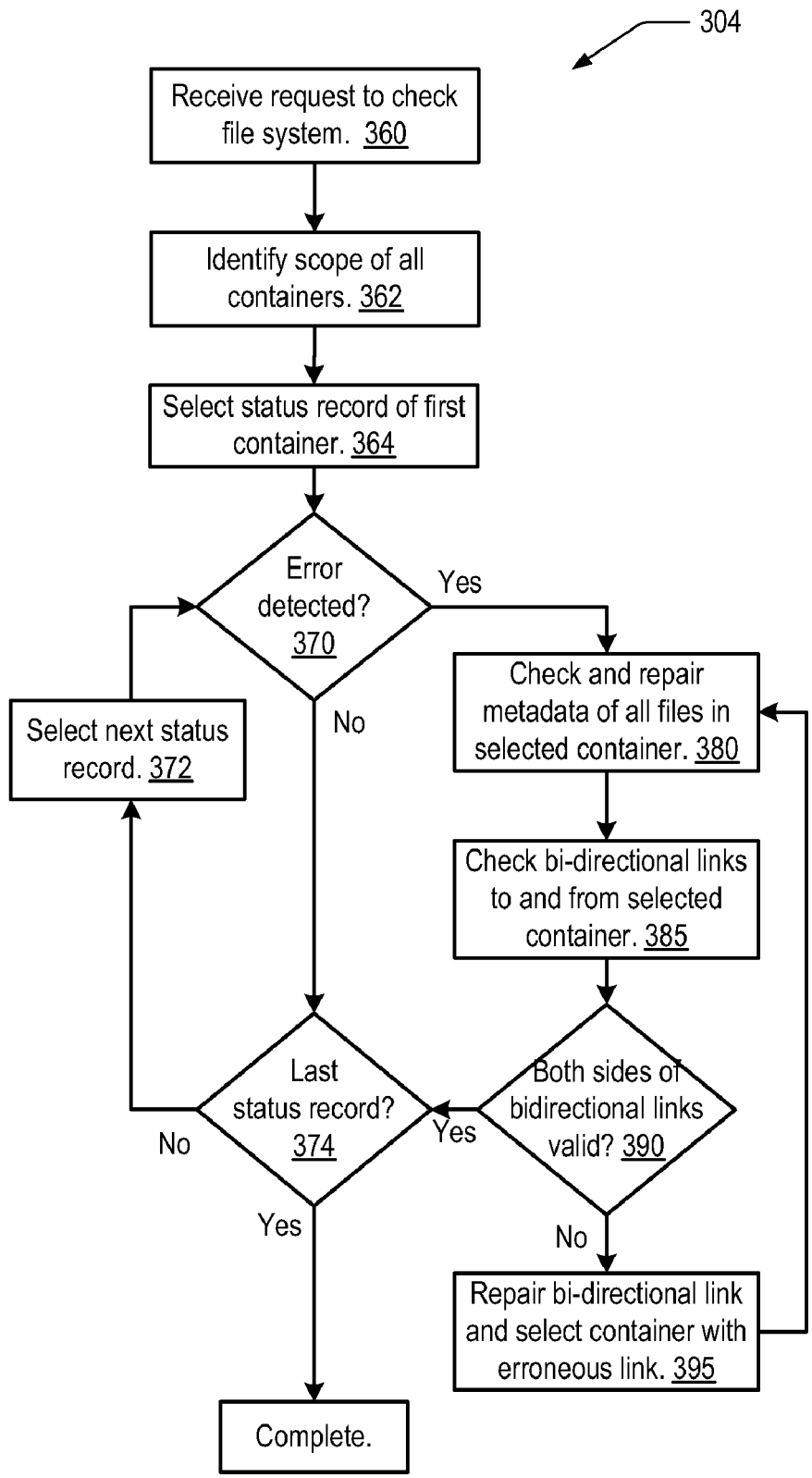
FIG. 3b illustrates one embodiment of a process that may be used to perform a consistency check on a file system.

Turning now to FIGS. 3a and 3b, generalized processes that may be executed by global resource manager 110 are shown. In particular, FIG. 3a illustrates one embodiment of a process 302 that may be used to store data within a file system and FIG. 3b illustrates one embodiment of a process 304 that may be used to perform a consistency check on a file system. It is noted that in alternative embodiments, the individual blocks illustrated in processes 302 and 304 may be executed in a different order and/or that some blocks may be executed in parallel with others. As used herein, a consistency check may comprise one or more processes configured to detect and/or correct errors.

Process 302 may begin with reception of a request to store data in a file system (block 310). If the request requires creation of a new top-level directory (decision block 320), then a new container may be created (block 330), the data may be stored in the new container along with associated metadata (block 335), and the process completed. A container, as used herein and described in further detail below, refers to a dynamically created, variable-sized portion of a file system that includes a number of allocated units of data storage and associated units of metadata storage. In one embodiment, data may be stored in blocks and associated metadata stored in inodes. Containers may be used to isolate ownership of inodes and blocks. For example, inodes in a container may only reference blocks in the same container.

If the target location is not a new top-level directory (decision block 320), then a container that includes a parent file of the data to be stored may be identified (block 340). If the request does not require a new directory below the top level directory to be created (decision block 342), then the data may be stored in the identified container along with associated metadata (block 344) and the process completed. In other words, new file data to be stored in an existing directory may always be stored in the same container as the parent directory. If the request does require a new directory below the top level directory to be created and if space is determined to be sufficient to hold the expected data for the new directory (decision block 350), then the data may be stored in the identified container along with associated metadata (block 344) and the process completed. Otherwise, a new, linked container may be created (block 352). Then, the data may be stored in the linked container along with associated metadata (block 354). In addition, a bidirectional link may be created between the identified container and the linked container (block 356) to complete the process.

Process 304 may begin with reception of a request to check a file system for errors (block 360). Errors may be tracked in a status tracking table that records mismatched metadata and outstanding transactions. Once a request is received, the scope of resources allocated to each of the file system's containers may be checked (block 362) to localize the errors. Then, a status record corresponding to a first container may be selected (block 364). If an error is detected in the selected status record (decision block 370), the metadata for each of the files stored in the corresponding container may be checked and any errors corrected (block 380). In addition, any links between the corresponding container and other containers may be checked (block 385). If one or both sides of a bidirectional link are not valid (decision block 390), then the link may be repaired and the container to which the link connects may be selected (block 395). The newly selected container and its links may be checked in a similar manner via repeated execution of blocks 380, 385, 390, and 395 until no bidirectional link errors are detected. When there are no remaining link errors (decision block 390) or if no container errors where detected in the selected status record (decision block 370) and if the last status record has not been checked (decision block 374), a next status record may be selected (block 372) and error detection repeated (block 370). Once the last status record has been checked (decision block 374), the process is complete.

Figure 4:
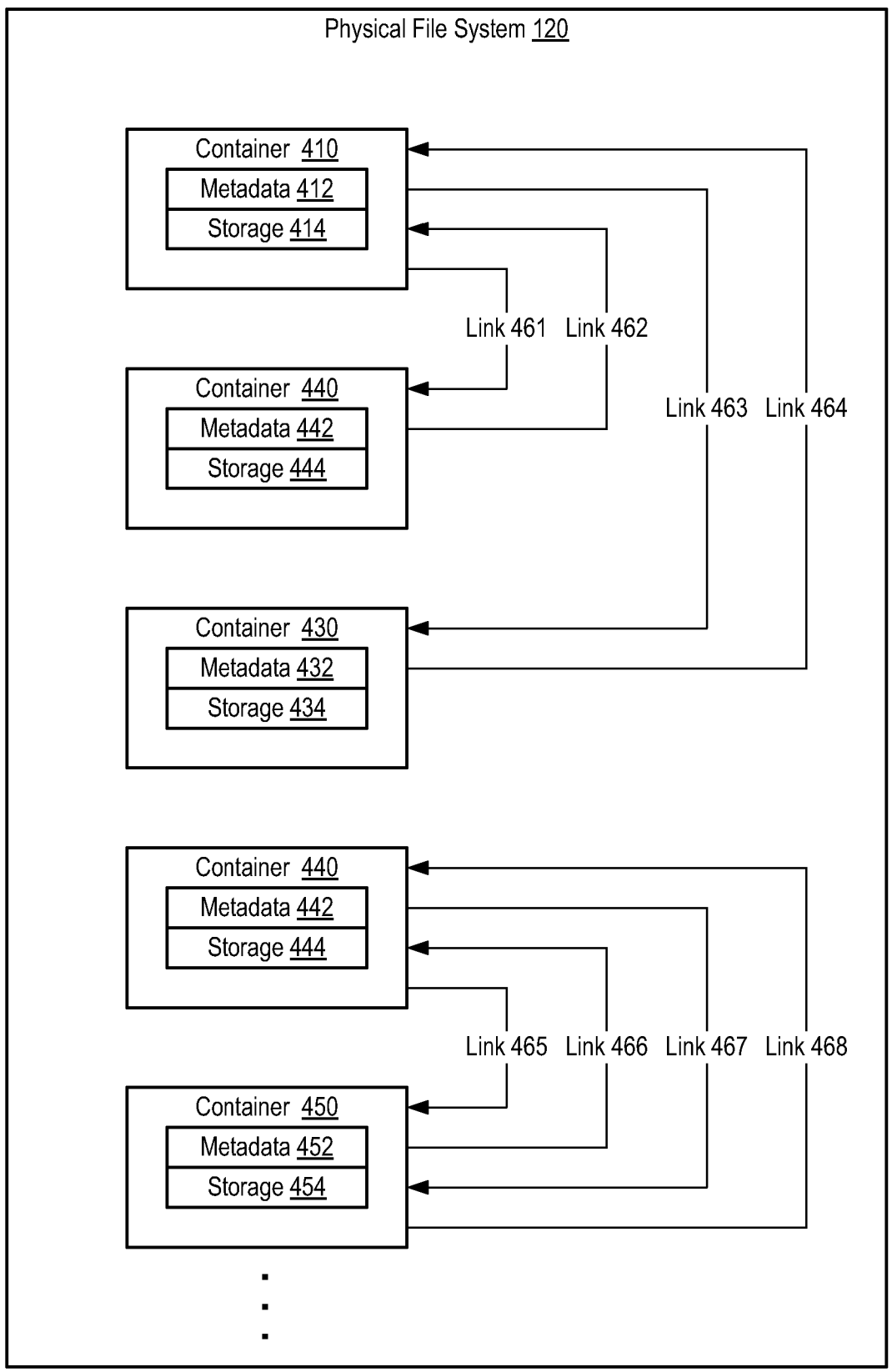
FIG. 4 is a generalized block diagram of one embodiment of a physical file system.

FIG. 4 is a generalized block diagram of one embodiment of physical file system 120. In the illustrated embodiment, physical file system 120 includes one or more containers such as containers 410, 420, 430, 440, and 450. Each container includes storage space and associated metadata. For example, container 410 includes storage 414, which may includes space to store numerous data files. Container 410 also includes metadata 412, which includes metadata associated with the files stored in storage 414. Similarly, container 420 includes storage 424 and metadata 422, container 430 includes storage 434 and metadata 432, container 440 includes storage 444 and metadata 442, and container 450 includes storage 454 and metadata 452. Although only five containers are shown, more or fewer containers may be included in physical file system 120. Each container may be linked to one or more other containers through bidirectional links, also know as cross-container references.

For example, in the illustrated embodiment, containers 410 and 420 are connected via links 461 and 462, containers 410 and 430 are connected via links 463 and 463, and containers 440 and 450 are connected via links 465, 466, 467, and 468. A link may be established from one container to a second container if a particular condition is detected such as the first container not having sufficient resources for the additional stored data. Such a condition may be referred to as an overflow and the second container referred to as a linked container. For example, in one embodiment, a linked container may be added when adding more storage to the first container would require it to manage more than a pre-determined maximum number of storage units, objects, files, etc. In various embodiments, the criteria defining whether resources are sufficient may include any desired criteria instead of or in addition to availability of storage resources and may be determined by policy, dynamically by user input, or by any other desired means.

Figure 5:
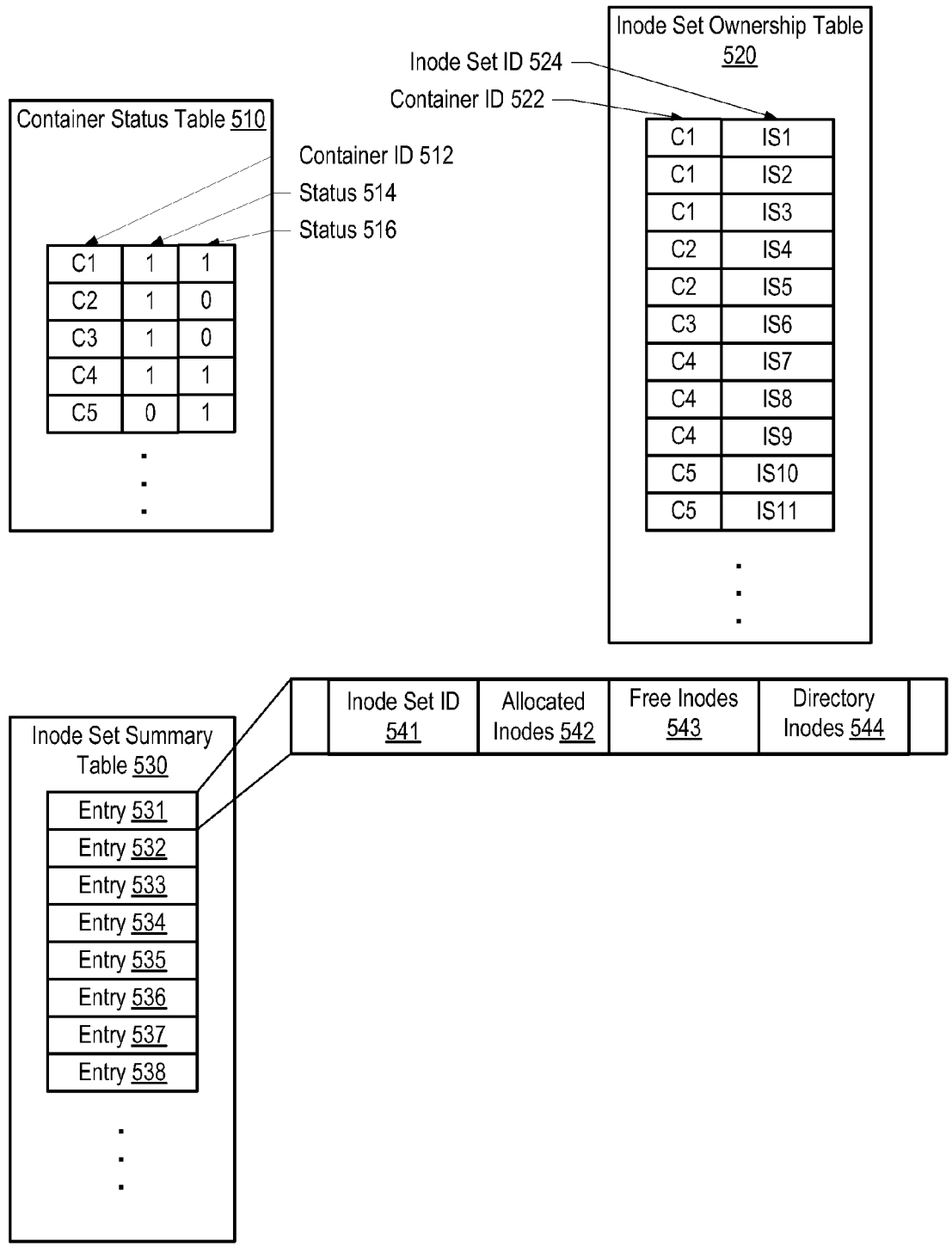
FIG. 5 illustrates one embodiment of a set of tables that may be used to manage containers and their associated inodes.
Figure 6:
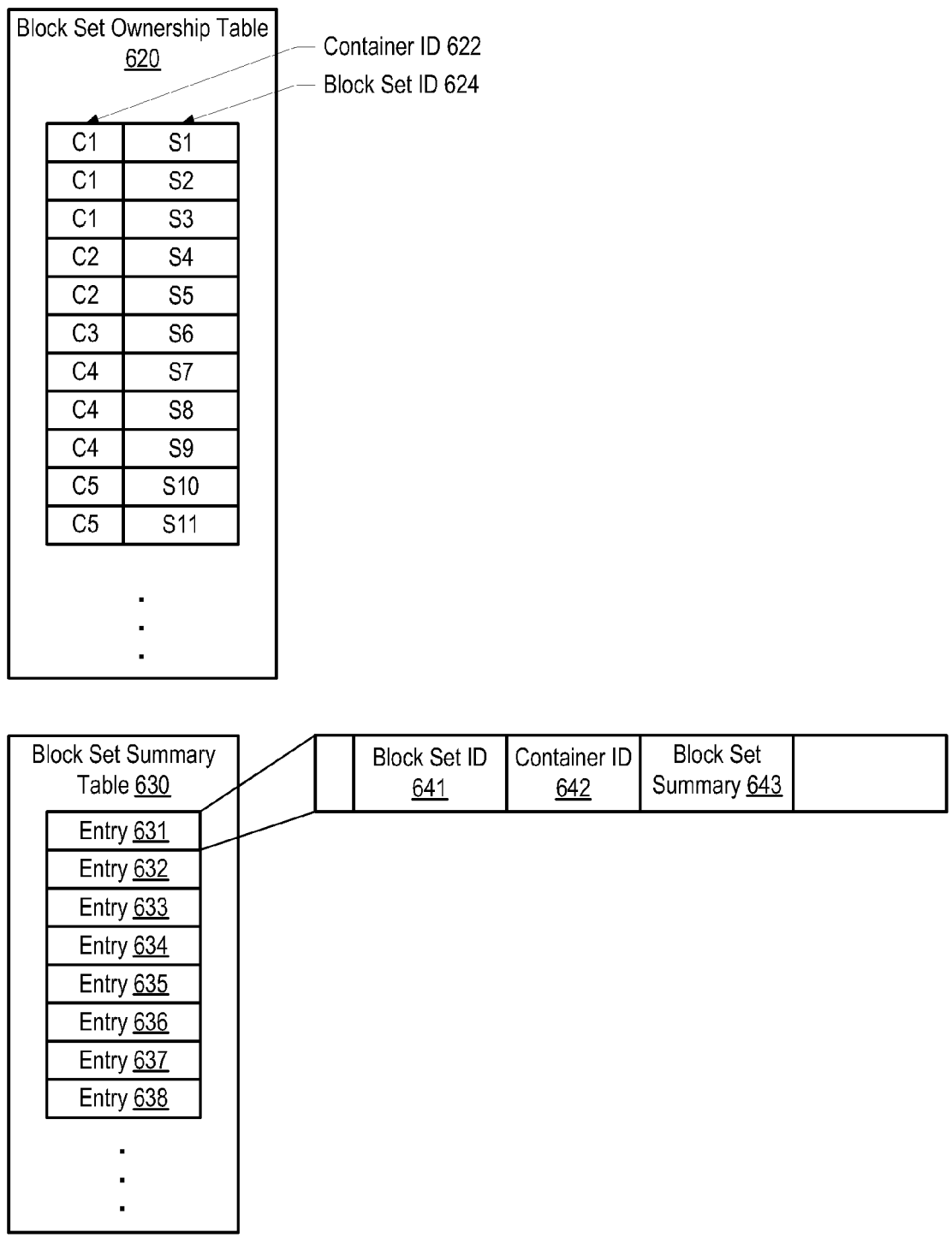
FIG. 6 illustrates one embodiment of a set of tables that may be used to manage containers and their associated blocks.
Figure 7:
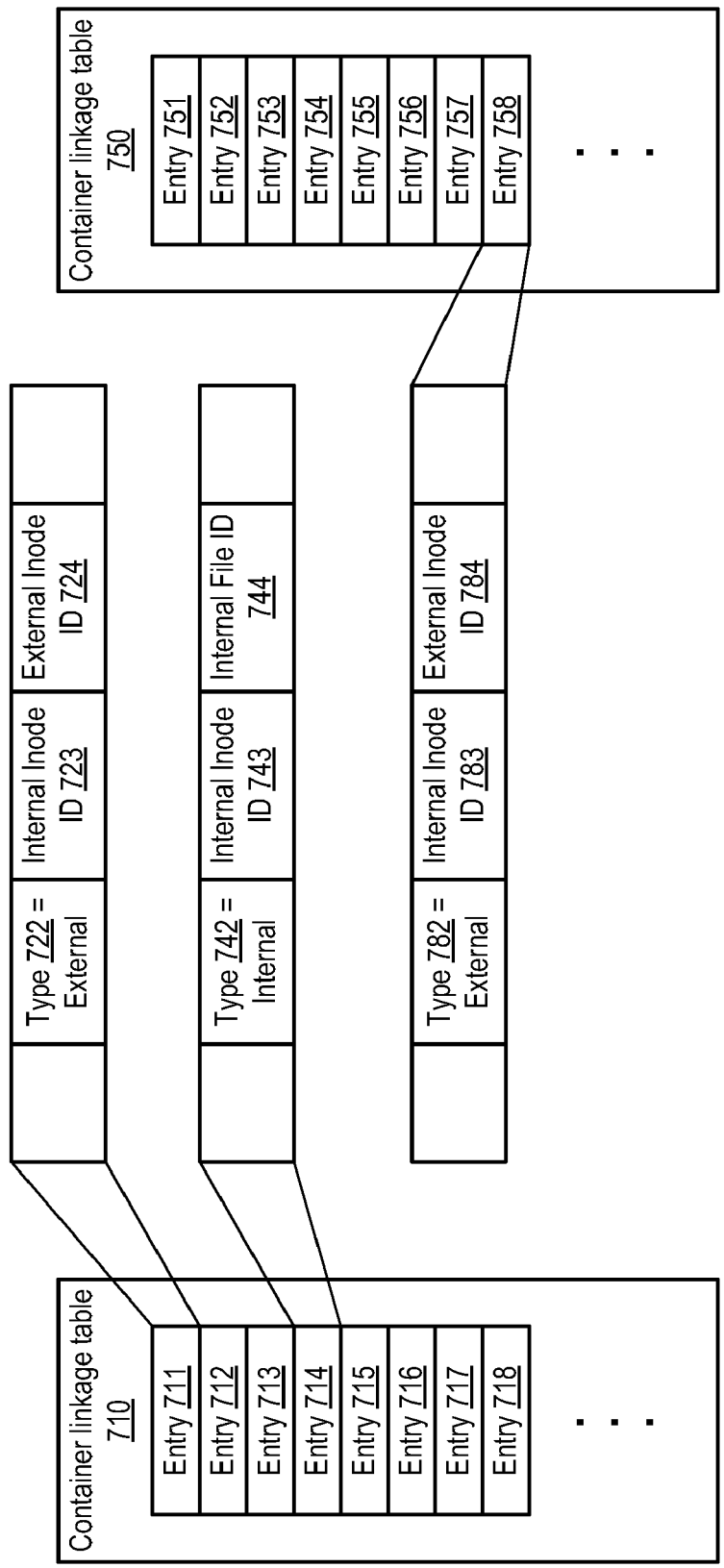
FIG. 7 illustrates one embodiment of container linkage tables that may be used to manage containers and their associated links.

In one embodiment of physical file system 120, storage and metadata may consist of conventional blocks and inodes. More particularly, each of storage elements 414, 424, 434, etc may consists of one or more allocations of sets of blocks and each of metadata elements 412, 422, 432, etc may consists of corresponding sets of inodes. Sets of blocks and inodes may be allocated to containers via processes that will be further described below. Global resource manager 110 may maintain records of the mapping of blocks and inodes to containers as well as tracking the links between containers using a variety of data structures. FIGS. 5, 6, and 7 and the accompanying descriptions provide details of one embodiment of such data structures in which the unit of metadata is an inode and the unit of data storage is a block. In alternative embodiments, any of a variety of storage allocation units and metadata units may be used instead of blocks and inodes.

FIG. 5 illustrates one embodiment of a set of tables that may be used to manage containers and their associated inodes. FIG. 5 includes a container status table 510, an inode set ownership table 520, and an inode set summary table 530. Table 510 may include an entry for each container that has been created in a file system. Entries may be distinguished, as indicated in the illustrated embodiment, by container ID 512. Accordingly, five entries are shown identified by container IDs C1, C2, C3, C4, and C5. An entry may be added to the table each time a container is added to the file system. Each entry may also include status bits 514 and 516. Status bits 514 and 516 may record potential error conditions associated with the corresponding container.

For example, in one embodiment, status bit 514 may indicate that an outstanding transaction exists involving data that is or will be stored in the corresponding container. Status bit 516 may indicate that conflicting metadata references exist. Although outstanding transactions are not necessarily errors, if an outstanding transaction status bit is set at a time when the file system is expected to be quiescent, an error may be assumed. Conflicting metadata references may also be assumed to indicate an error in the file system. Such conditions may be encountered whenever an unexpected power interruption takes place during a transaction, after a hardware failure, or because of a software error, etc. Upon system reboot, an outstanding transaction bit may be set indicating that the transaction was not completed even though the transaction is no longer pending. Other error conditions that may be tracked by a status bit will be apparent to one of ordinary skill in the art.

Table 520 may include an entry for each set of inodes that has been allocated in a file system. Entries may be distinguished, as indicated in the illustrated embodiment, by inode set ID 524. Accordingly, eleven entries are shown identified by inode set IDs IS1-IS11. An entry may be added to the table each time an inode set is allocated in the file system. Each entry may also include a container ID 522 that indicates to which container the inode set has been allocated.

Table 530 contains data that summarizes the inode usage of each container. In one embodiment, table 530 may include entries 531-538, etc. Each entry may include an inode set ID 541, an allocated inodes count 542, a free inodes count 543, and a directory inode count 544. An entry may be updated in the table each time an inode is allocated, such as whenever a file or directory is added to the file system. Inode set ID 541 may hold a value identifying the inode set and matching the value of inode set ID 524 in table 520. Table 530 may be indexed by inode ID 541. Allocated inode count 542 tracks the number of inodes in the set that are allocated. Free inodes count 543 tracks the number of inodes in the set that are available to be allocated. Directory inode count 544 tracks the number of inodes that are associated with directories rather than files.

FIG. 6 illustrates one embodiment of a set of tables that may be used to manage containers and their associated blocks. FIG. 6 includes a block set ownership table 620, and a block set summary table 630. Table 620 may include an entry for each set of blocks that has been allocated in a file system. Entries may be distinguished, as indicated in the illustrated embodiment, by block set ID 624. Accordingly, eleven entries are shown identified by block set IDs S1-S11. An entry may be added to the table each time a block set is allocated to a container. Each entry may also include a container ID 622 that indicates to which container the block set has been allocated. Table 630 may include an entries 631-638, etc. Each entry may include a block set ID 641, a container ID 642, and a block set summary 643. Block set ID 641 may hold a value identifying the block set and matching the value of block set ID 624 in table 620. Container set ID 642 may hold a value identifying the container to which the block is allocated and matching the value of container ID 622 in table 620. Block set summary 643 may include data describing the usage of the blocks associated with block set ID 641. An entry may be updated in table 630 each time a block is used, such as whenever file data is added to the file system.

FIG. 7 illustrates one embodiment of container linkage tables 710 and 750 that may be used to manage containers and their associated links. Each container may be associated with its own container linkage table. Table 710 may include entries 711-718, etc., and may be associated with a first container. Similarly, table 750 may include entries 751-758, etc., and may be associated with a second container. Each entry may include a type field, and two additional fields. For example, entry 711 may include type 722, an internal inode ID 723, and an external inode 724. Type 722 has a value of external, indicating that internal inode 723 references an inode in another container, identified by external inode ID 724. If there are no errors or metadata mismatches in the file system, a corresponding second entry will be present in another container linkage table, such as table 750, which in this case includes a matching entry 758. Entry 758 includes type 782, which has a value of external, indicating that internal inode 783 references an inode in another container, identified by external inode ID 784. In this case, internal inode ID 783 has the same value as external inode ID 724 of entry 711, and external inode ID 784 has the same value as internal inode ID 723 of entry 711. Also shown is entry 714 including type 742, an internal inode ID 743, and an internal file ID 744. Type 722 has a value of internal, indicating that internal inode 743 references a file within the same container, identified by internal file ID 744. Unlike entries 711 and 758 that form a bidirectional pair, entry 714 does not have a matching entry in another container linkage table. Rather, entry 714 indicates an extra hard link between a file and a directory in the same container. All files may have at least one link to a directory, but may have additional links to other directories. Each additional link may be tracked via an entry such as entry 714 in table 710. During repair operations, a global resource manager may make use of the redundancies that exist in matching pairs of entries to determine the proper state of file system metadata.

Figure 8:
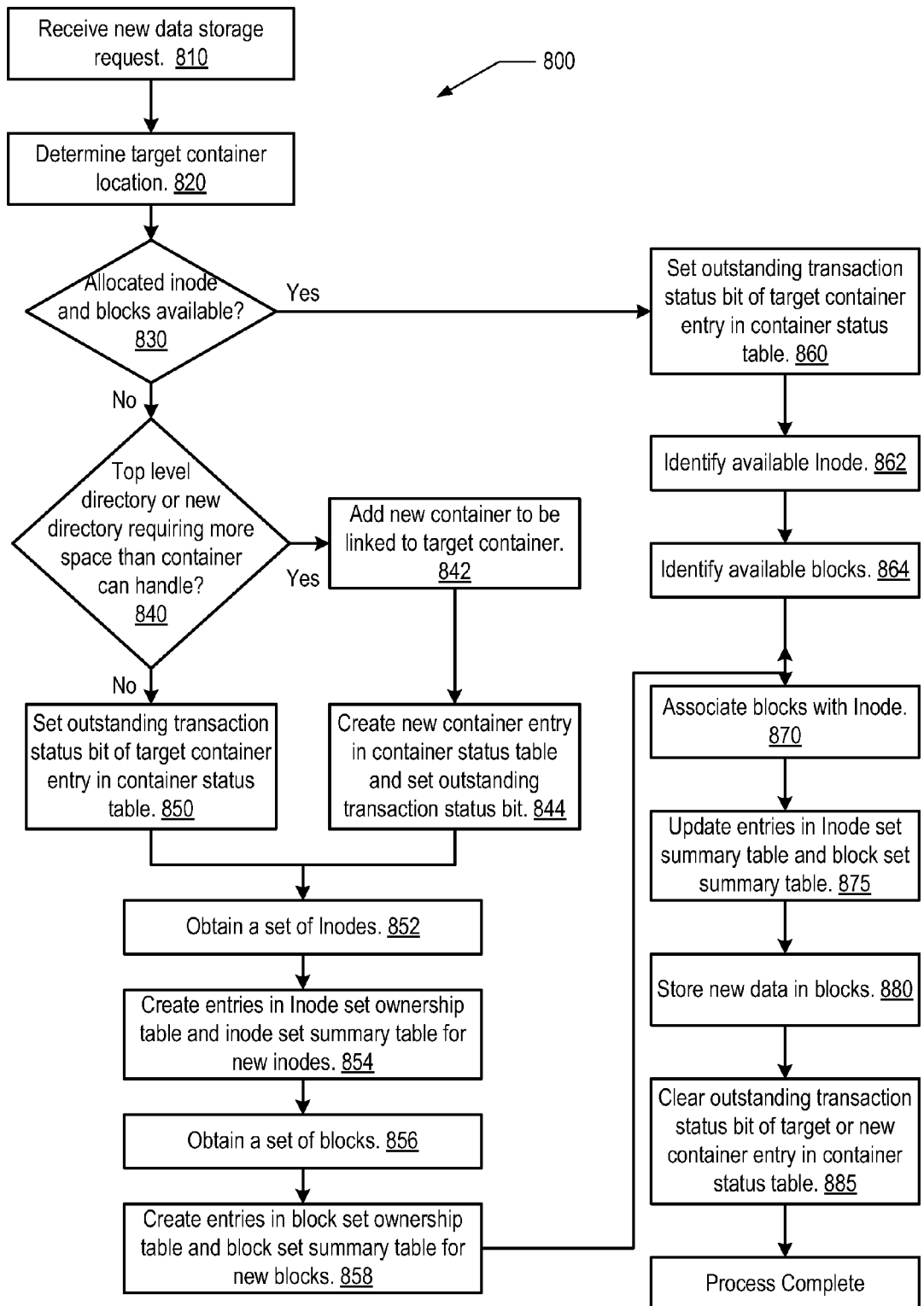
FIG. 8 illustrates one embodiment of a process that may be used to store data within a file system.

FIG. 8 illustrates one embodiment of a process 800 that may be used to store data within a file system. Process 800 may begin with the reception of a new data storage request (block 810). The container targeted by the storage request may first be determined (block 820). Then, if an inode and a sufficient number of blocks are available to hold the data from the request (decision block 830), the outstanding transaction status bit of the target container in the container status table may be set (block 860). To determine the availability of inodes, an inode set ownership table and inode set summary table may be consulted. To determine the availability of blocks, a block set ownership table and block set summary table may be consulted. The available inode may be identified (block 862), the available blocks may be identified (block 864), and the blocks associated with the inode (block 870). Once the inode and blocks are associated and designated to be used, their corresponding entries in both an inode set summary table and a block set summary table may be updated to indicate that they are in use (block 875). Data may then be stored in the designated blocks (block 880). After the data has been stored, the outstanding transaction status bit of the target container in the container status table may be cleared (block 885) to complete the process.

Returning to decision block 830, if an inode and a sufficient number of blocks are not available in the target container to hold the data from the request, the type of new data request may be determined. If the request is to not to add a new top level directory or a new directory that requires more space than the target container can provide (decision block 840), the outstanding transaction status bit of the target container in the container status table may be set (block 850). A set of inodes may be obtained and allocated to the target container (block 852). New entries in the inode set ownership table and the inode set summary table may be created to indicate that the new inodes are allocated to the target container and are in use (block 854). A set of blocks may be obtained and allocated to the target container (block 856). New entries in the block set ownership table and the block set summary table may be created to indicate that the new blocks are allocated to the target container and are in use (block 858). One or more new blocks may be associated with a new inode (block 870) and the remainder of process block 875, 880, and 885 performed, completing the process as previously described.

Returning to decision block 840, if the request is to to add a new top level directory or a new directory that requires more space than the target container can provide, a new, linked container may be added to the file system linked to the target container (block 842). A new container entry may then be created in the container status table and the outstanding transaction status bit of the new entry may be set (block 844). Process 800 may then continue to completion from block 852 on. It is noted that in alternative embodiments, the individual blocks illustrated in process 800 may be executed in a different order and/or that some blocks may be executed in parallel with others.

Figure 9:
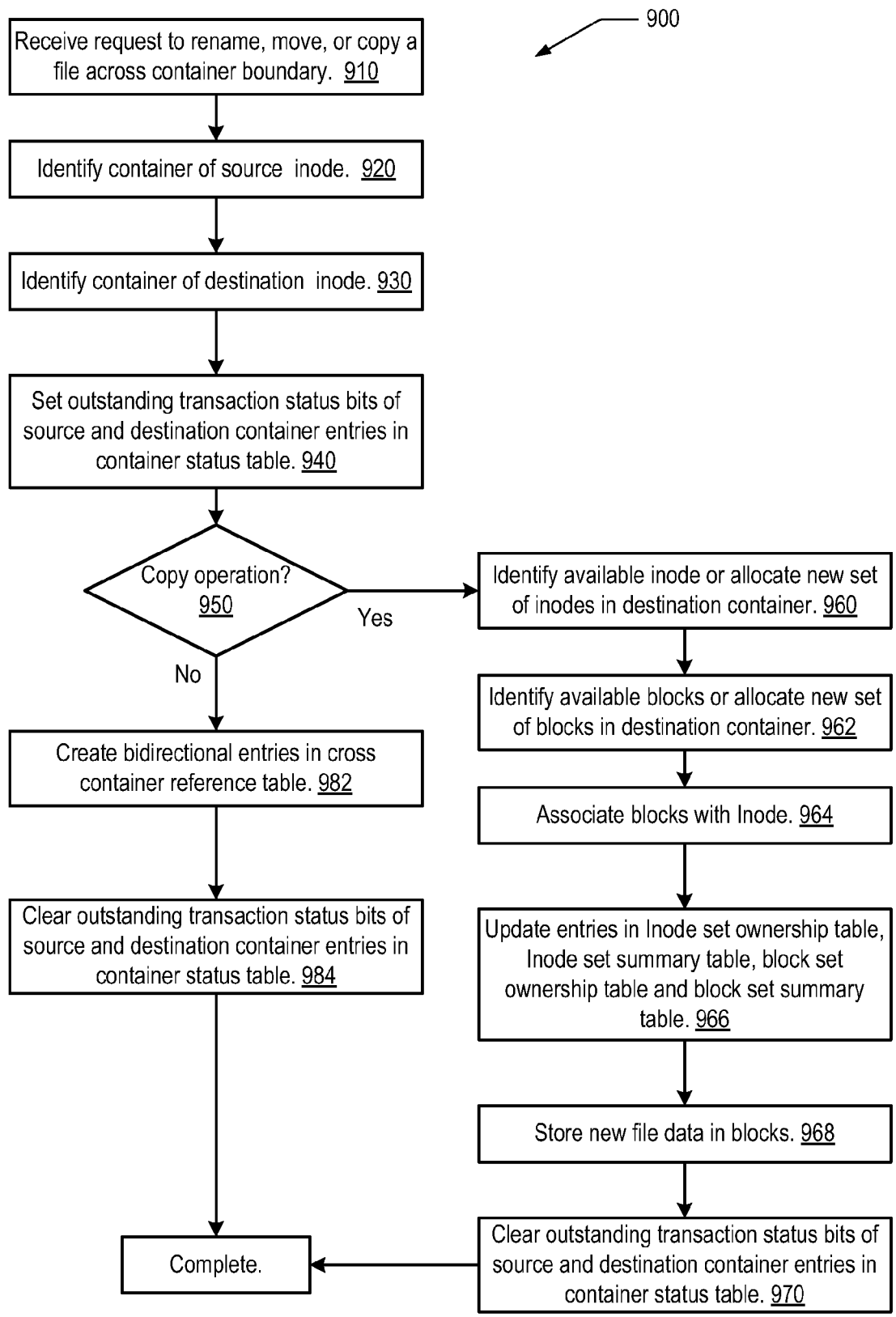
FIG. 9 illustrates one embodiment of a process that may be used to track file system operations that cross container boundaries.

FIG. 9 illustrates one embodiment of a process 900 that may be used to track file system operations that cross container boundaries. Process 900 may begin with the receipt of a request to rename a file, move a file, copy a file, etc., within a namespace that creates a cross reference between two file containers (block 910). A source container may be identified (block 920) and destination container may be identified (block 930). For example, a file may be moved or copied from one node in the namespace that is mapped to a first container (the source) to another node in the namespace that is mapped to a second container (the destination). Alternatively, removing a file that is stored in one container to a directory associated with another container may be implemented by creating a cross-container reference between the containers. Once the source and destination containers have been identified, the outstanding transaction status bits of the source and destination containers in the container status table may be set (block 940). Then, if the operation is a copy operation, an inode may be identified or obtained in the destination container (block 960) and a sufficient number of blocks to hold the file data may be identified or obtained in the destination container (blocks 962). To determine the availability of inodes, an inode set ownership table and inode set summary table may be consulted. To determine the availability of blocks, a block set ownership table and a block set summary table may be consulted. The blocks may be associated with the inode (block 964).

Once the inode and blocks are associated and designated to be used, their corresponding entries in an inode set summary table, inode set ownership table, block set ownership table, and a block set summary table may be updated to indicate that they are in use (block 966). Data may then be stored in the designated blocks (block 968). After the data has been stored, the outstanding transaction status bit of the target container in the container status table may be cleared (block 970), completing the process.

If the operation is not a copy operation, such as if it is a move or rename operation, bidirectional pairs of entries may also be created in the container linkage table (block 982). The outstanding transaction status bit of the target container in the container status table may then be cleared (block 984), completing the process. It is noted that in alternative embodiments, the individual blocks illustrated in process 900 may be executed in a different order and/or that some blocks may be executed in parallel with others.

Figure 10:
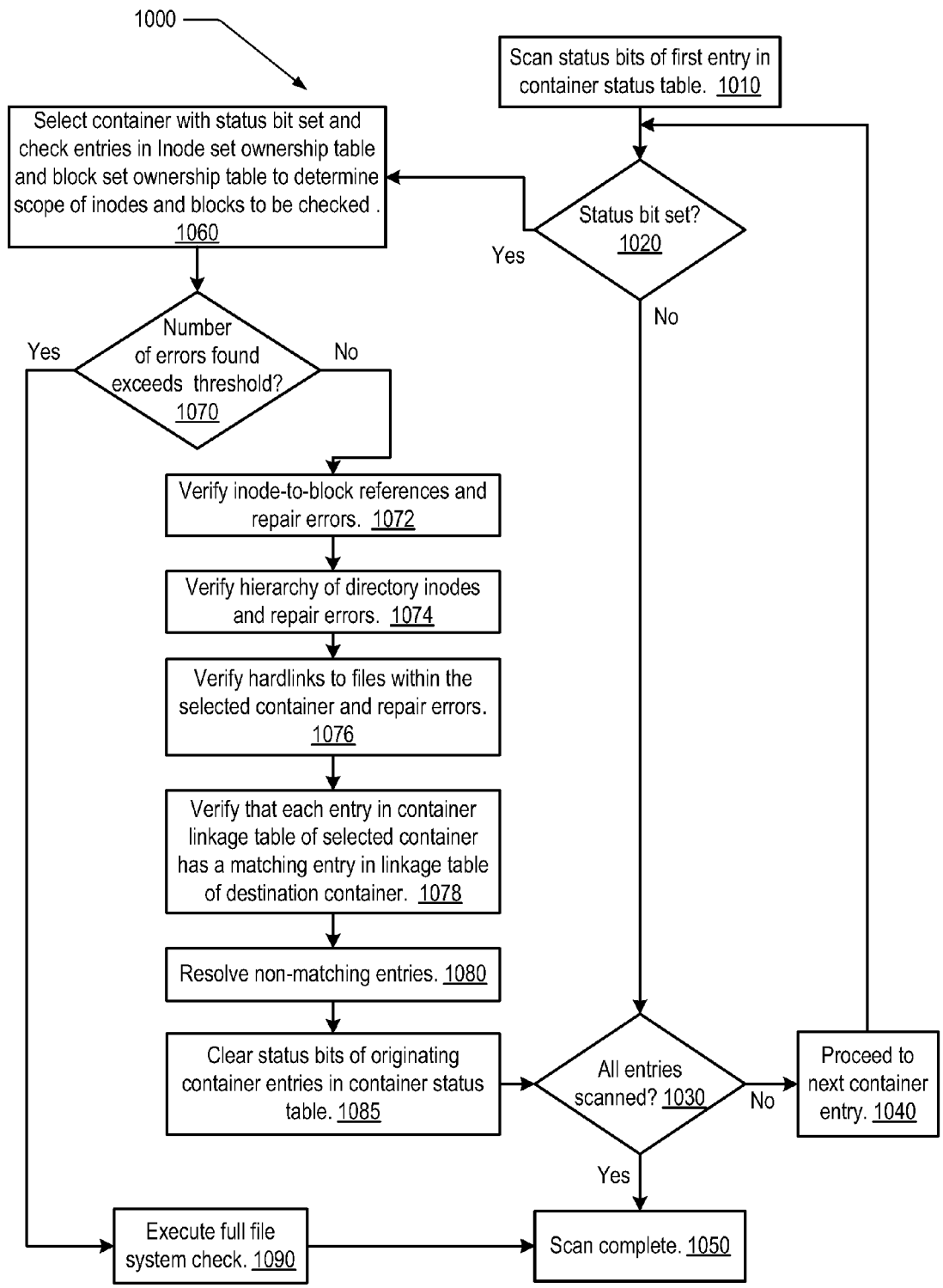
FIG. 10 illustrates one embodiment of a process that may be used to scan a file system for errors.

FIG. 10 illustrates one embodiment of a process 1000 that may be used to scan a file system for errors. Process 1000 may begin with a scan of the status bits of the first entry in a container status table corresponding to a selected container whenever a system reboot takes place or in response to a command from a user or an application, etc. (block 1010). It may be assumed that when a scan takes place, the file system has been placed in a quiescent state. Consequently, any outstanding transaction status bits that are set may be interpreted to be file system errors. If a status bit is not set for the selected container entry (decision block 1020), and if all entries in the container status table have been scanned (decision block 1030), process 1000 is complete (block 1050). If a status bit is set (decision block 1020), the corresponding portion of the file system may be checked and errors corrected.

The error correction process may use processes similar to those used in the well-known FSCK operation, although only a portion of the file system is checked. Consequently, this process may be referred to as a "partial-FSCK." More specifically, in one embodiment the entries in an inode set ownership table and a block set ownership table corresponding to the selected container may be checked to determine the ranges of inodes and blocks to be verified (block 1060). The corresponding entries in the inode set summary table and entries in the block set summary table may also be read into memory to further validate the inode and block ownership. Conflicts in inode and block ownership may be resolved. The entries in the inode set summary table and the block set summary table are also subject to modification later in process 1000. If the number of errors that are found exceeds some predetermined threshold value (decision block 1070), such as might be the case if major file system corruption has occurred, then a full file system check may be executed (block 1090) and the process is complete (block 1050).

If only a few containers are found to contain errors (decision block 1070), then the inode-to-block references may be verified and any errors that are found may be repaired (block 1072). Each container may be examined independently. More specifically, if an inode references blocks from a block set without an owner, the block set may be added to the selected container, where an ownership grant is protected by a lock. If the block set is owned by another container, the conflict may be noted for subsequent resolution after the other container is checked and verified.

Next, the hierarchy of inodes may be verified and errors repaired (block 1074). More specifically, the verification may include checking all the directory blocks and directory entries for proper parent-child relationships. In addition, a container linkage table may be checked. This check may include verifying any hard links to files within the selected container and repairing any errors that may be found (block 1076). Also, entries in the container linkage table of the selected container that reference other containers may be verified (block 1078). If an entry in the container linkage table of the selected container refers to an inode in an external container, then a corresponding entry in the container linkage table of the external container should also be present. If not, an error exists and the external container must be verified. No entries or matching bidirectional entries indicate no cross-container errors exist. Mismatched entries may be resolved by one of a variety of policies or algorithms (block 1080). For example, the values of the entry in the container linkage table corresponding to the selected container may be assumed to be incorrect and revised to be consistent with the corresponding opposite direction entry. Alternatively or in addition, erroneous directory entries and dangling links to and from the current container may be removed. Orphaned inodes may be linked to a lost-and-found directory.

Once the entries have been repaired, the status bit error in the container status table corresponding to the selected container may be cleared (block 1085). If all entries in the container status table have been scanned (decision block 1030), process 1000 is complete (block 1050). If all entries in the container status table have not been scanned (decision block 1030), process 1000 may be repeated for each entry in the container status table by proceed to scanning of a next container entry (block 1040) and to checking the status bits (decision block 1020), etc. It is noted that in alternative embodiments, the individual blocks illustrated in process 1000 may be executed in a different order and/or that some blocks may be executed in parallel with others.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer file system comprising:
   stored data; and
   stored metadata;
   wherein in response to detecting that a file system error has occurred, the file system is configured to:
      identify a first container which corresponds to the detected error;
      perform a consistency check of file data and metadata included in the first container;
      determine if a first bidirectional link exists between the first container and a second container; and
      perform a consistency check of file data and metadata included in the second container, in response to detecting an error in said first bidirectional link;
   wherein the file system is further configured to maintain a table of bidirectional links between a plurality of containers;
   wherein said table includes at least one pair of entries, each entry identifying a source container, a source inode, and a destination inode;
   wherein a source inode of a given entry corresponds to a source container of the given entry; and
   wherein for a given pair of entries, a destination inode of a first entry is the same as a source inode of a second entry.

2. The system of claim 1, wherein if an error is found in said first bidirectional link, the file system is further configured to:
   perform a consistency check of file data and metadata included in the second container;
   determine if a second bidirectional link exists between the second container and a third container; and
   perform a consistency check of file data and associated metadata included in the third container, in response to detecting an error in said second bidirectional link.

3. The system of claim 1, wherein each of said first and second containers comprises a dynamically created, variable-sized portion of the file system that includes allocated units of data storage and associated units of metadata storage, wherein metadata in a given container refers exclusively to data in the given container.

4. The system of claim 3, wherein in response to receiving a request to store new file data, the file system is further configured to:
   identify a target container that includes data linked to the new file data in a logical namespace;
   if the new file data does not include a new directory, or if the new file data includes a new directory and the target container has sufficient resources to accommodate a new directory, store the new file data in the target container; and
   if the target container does not have sufficient resources to accommodate a new directory:
   create a linked container;
   store the file data in the linked container; and store a bidirectional link between the target container and the linked container.

5. The system of claim 4, wherein the file system is further configured to store a bidirectional link between a third container and a fourth container in response to a file system operation that creates a connection in the logical namespace between file data stored in the third container and file data stored in the fourth container.

6. A method comprising:
   detecting that a file system error has occurred;
   identifying a first container which corresponds to the detected error;
   performing a consistency check of the file data and metadata included in the first container;
   determining if a first bidirectional link exists between the first container and a second container;
   performing a consistency check of file data and metadata included in the second container, in response to detecting an error in said first bidirectional link; and
   maintaining a table of bidirectional links between a plurality of containers;
   wherein said table includes at least one pair of entries, each entry identifying a source container, a source inode, and a destination inode;
   wherein a source inode of a given entry corresponds to a source container of the given entry; and
   wherein for a given pair of entries, a destination inode of a first entry is the same as a source inode of a second entry.

7. The method of claim 6, wherein if an error is found in said first bidirectional link, the method further comprises:
   performing a consistency check of file data and metadata included in the second container;
   determining if a second bidirectional link exists between the second container and a third container; and
   performing a consistency check of file data and associated metadata included in the third container, in response to detecting an error in said second bidirectional link.

8. The method of claim 6, wherein each of said first and second containers comprises a dynamically created, variable-sized portion of the file system that includes allocated units of data storage and associated units of metadata storage, wherein metadata in a given container refers exclusively to data in the given container.

9. The method of claim 8, wherein in response to receiving a request to store new file data in the file system, the method further comprises:
   identifying a target container that includes data linked to the new file data in a logical namespace;
   if the new file data does not include a new directory, or the new file data includes a new directory and the target container has sufficient resources to accommodate a new directory, storing the new file data in the target container; and
   if the target container does not have sufficient resources to accommodate a new directory:
      creating a linked container;
      storing the file data in the linked container; and
      storing a bidirectional link between the target container and the linked container.

10. The method of claim 9, further comprising storing a bidirectional link between a third container and a fourth container in response to a file system operation that creates a connection in the logical namespace between file data stored in the third container and file data stored in the fourth container.

11. A plurality of computer readable storage media storing computer instructions that are executable by a processor to:
   detect that a file system error has occurred;
   identify a first container which corresponds to the detected error;
   perform a consistency check of the file data and metadata included in the first container;
   determine if a first bidirectional link exists between the first container and a second container; and
   perform a consistency check of file data and metadata included in the second container, in response to detecting an error in said first bidirectional link;
   wherein the instructions are further executable to maintain a table of bidirectional links between a plurality of containers;
   wherein said table includes at least one pair of entries, each entry identifying a source container, a source inode, and a destination inode;
   wherein a source inode of a given entry corresponds to a source container of the given entry; and
   wherein for a given pair of entries, a destination inode of a first entry is the same as a source inode of a second entry.

12. The computer readable storage media of claim 11, wherein if an error is found in said first bidirectional link, the instructions are further executable to:
   perform a consistency check of file data and metadata included in the second container;
   determine if a second bidirectional link exists between the second container and a third container; and
   perform a consistency check of file data and associated metadata included in the third container, in response to detecting an error in said second bidirectional link.

13. The computer readable storage media of claim 11, wherein each of said first and second containers comprises a dynamically created, variable-sized portion of the file system that includes allocated units of data storage and associated units of metadata storage, wherein metadata in a given container refers exclusively to data in the given container.

14. The computer readable storage media of claim 13 wherein in response to receiving a request to store new file data in the file system, the instructions are further executable to:
   identify a target container that includes data linked to the new file data in a logical namespace;
   if the new file data does not include a new directory, or the new file data includes a new directory and the target container has sufficient resources to accommodate a new directory, store the new file data in the target container; and
   if the target container does not have sufficient resources to accommodate a new directory: create a linked container; store the file data in the linked container; and store a bidirectional link between the target container and the linked container.

15. The computer readable storage media as recited in claim 14, wherein the instructions are further executable to store a bidirectional link between a third container and a fourth container in response to a file system operation that creates a connection in the logical namespace between file data stored in the third container and file data stored in the fourth container.

* * * * *